(12) United States Patent
Tracy, III et al.

(10) Patent No.: US 7,713,407 B2
(45) Date of Patent: May 11, 2010

(54) PRODUCTION OF LOW SULFUR FUELS USING IMPROVED HYDROCRACKER POST-TREATMENT CATALYST

(75) Inventors: William J. Tracy, III, Burke, VA (US); Chuansheng Bai, Phillipsburg, NJ (US); Robert A. Bradway, Vienna, VA (US); William E. Lewis, Baton Rouge, LA (US); Randolph J. Smiley, Baton Rouge, LA (US)

(73) Assignee: ExxonMobil Research & Engineering Company, Annandale, NJ (US)

( * ) Notice: Subject to any disclaimer, the term of this patent is extended or adjusted under 35 U.S.C. 154(b) by 96 days.

(21) Appl. No.: 11/446,251

(22) Filed: Jun. 2, 2006

(65) Prior Publication Data

US 2007/0278135 A1    Dec. 6, 2007

(51) Int. Cl.
*C10G 65/00* (2006.01)
*C10G 69/00* (2006.01)

(52) U.S. Cl. .................. 208/58; 208/59; 208/97; 208/108; 208/111; 208/213; 208/215; 208/216 R; 208/217; 208/254 H (58) Field of Classification Search .......... 208/58, 208/59, 97, 108, 111, 213, 215, 216 R, 217, 208/254 H
See application file for complete search history.

(56) References Cited

U.S. PATENT DOCUMENTS 3,338,819 A * 8/1967 Wood .................... 208/97
4,415,436 A    11/1983 Angevine
5,885,440 A *  3/1999 Hoehn et al. ............. 208/97
6,783,663 B1 * 8/2004 Riley et al. ............. 208/213

FOREIGN PATENT DOCUMENTS

| EP | 0 537 500 A2 | 4/1993 |
|----|--------------|--------|
| WO | WO 00/41810 | 7/2000 |
| WO | WO 00/42119 | 7/2000 |
| WO | WO 2006/036609 A1 | 4/2006 |

* cited by examiner

*Primary Examiner*—Glenn Caldarola
*Assistant Examiner*—Prem C. Singh (57) ABSTRACT

A hydrocracking process for converting a petroleum feedstock to higher gravity, lower sulfur products, especially ultra low sulfur road diesel fuel. The process may be operated as a single-stage or two-stage hydrocracking. In each case, a hydrocracking step is followed directly by a post-treat hydrodesulfurization zone using a bulk multimetallic catalyst comprised of at least one Group VIII non-noble metal and at least two Group VIB metals with a ratio of Group VIB metal to Group VIII non-noble metal is from about 10:1 to about 1:10. In the two-stage option with interstage ammonia removal, the initial hydrocracking step may be followed by hydrodesulfurization using the bulk multimetallic catalyst prior to the ammonia removal which is followed by the second hydrocracking step. A final hydrodesulfurization over the bulk multimetallic catalyst may follow. The hydrodesulfurization over the bulk multimetallic catalyst is carried out at a pressure of at least 25 barg and preferably at least 40 barg.

19 Claims, 2 Drawing Sheets

PRODUCTION OF LOW SULFUR FUELS USING IMPROVED HYDROCRACKER POST-TREATMENT CATALYST

FIELD OF THE INVENTION

This invention relates to a hydrocracking process which uses a post-treat zone for reducing the sulfur content of the hydrocracked products.

The catalyst in the post-treat stage is a bulk multimetallic catalyst comprised of at least one Group VIII non-noble metal and at least two Group VIB metals with a ratio of Group VIB metals to Group VIII non-noble metal from about 10:1 to about 1:10.

BACKGROUND OF THE INVENTION

Environmental and regulatory initiatives are requiring increasingly lower levels of sulfur and aromatics in distillate fuels. For example, the proposed sulfur limit for distillate fuels to be marketed as road diesel in the European Union for the year 2005 was 50 wppm. Other regulations require lower levels of total aromatics in hydrocarbons and, more specifically, to lower levels of polycyclic aromatics in distillate fuels and heavier hydrocarbon products. For example, the maximum allowable aromatics levels for U.S. road diesel, CARB reference diesel, and Swedish Class I diesel are 35, 10 and 5 vol. %, respectively. Further, the CARB and Swedish Class I diesel fuels allow no more than 1.4 and 0.02 vol. % polyaromatics, respectively. In California, the use of Ultra Low Sulfur Diesel (ULSD) with a sulfur content of not more than 15 ppmw will become mandatory from 1 Jun. 2006 with a similar constraint to be met everywhere in the U.S. by September 2006. Consequently, much work is presently being done to produce compliant fuels, mainly by hydroprocessing.

Hydrocracking is a well-established method for converting lower value petroleum streams such as FCC cycle oils into more highly refined products with higher hydrogen:carbon ratios and reduced contents of heteroatoms, sulfur and nitrogen. Depending mainly on the desired boiling range of the products, the hydrocracking may be carried out either in a single stage or a two-stage unit. In the two-stage unit, the hydrocracking is typically carried out in a three-reactor, fixed bed unit in which the overall hydrocracking sequence is conducted in the presence of different catalysts each with its own distinct functionality. The feed and added hydrogen are cascaded directly from the initial hydrotreating step to the first hydrocracking step without interstage separation of inorganic heteroatoms (hydrogen sulfide, ammonia). An interstage water wash after the first hydrocracking step is then conventionally carried out to remove ammonia and an amine scrub may also be used to remove hydrogen sulfide from the hydrogen which is then recycled to the unit. One conventional, two-stage hydrocracker uses an initial hydrotreating catalyst in the first reactor (R1), conventionally a CoMo and/or NiMo HDT catalyst. The main portion of boiling range conversion is carried out in the second and third reactors (R2, R3) under more severe reaction conditions using a catalyst which is normally comprised of a Group VIB base metal (Cr, Mo, N, etc.) with one or more Group VIII base metals (Fe, Co Ni, etc.) as promoters on a refractory support such as alumina or silica-alumina, although noble metal catalyst such as palladium or platinum catalysts may also be used; NiW on silica-alumina is a common choice for this catalyst. A post-treat HDT catalyst may be provided at the end of the first stage hydrocracking and also at the end of the second stage hydrocracking reactor zones. The purpose of the post-treat catalyst is mainly to remove reversion mercaptans so as to allow production of low sulfur naphtha for reformer feeds but it has often been found that the hydrocracker diesel frequently contains more than 50 ppm sulfur, a level inconsistent with present or expected regulations. In fact, the achievement of ultra low sulfur levels such as are required by current regulations is difficult even with advances in techniques and catalysts; the difficulty of producing ultra low sulfur diesel fuel has been noted: Hu et al, NPRA Paper No. AM-06-46, (March 2006), "*The Era of ULSD—New Challenges and Opportunities for Hydrocracking Processes.*"

Hydrotreating catalysts that are particularly suitable for hydrodesulfurization, as well as hydrodenitrogenation, generally contain molybdenum or tungsten, usually the former, on alumina promoted with a metal such as cobalt, nickel, iron, or a combination of these metals. Cobalt promoted molybdenum on alumina catalysts are most widely used when the limiting specifications are hydrodesulfurization, while nickel promoted molybdenum on alumina catalysts are the most widely used for hydrodenitrogenation, partial aromatic saturation, as well as hydrodesulfurization. Recently, a class of nickel-based multimetallic catalysts have been demonstrated to possess very hydrodesulfurization activity when used as hydrocracker pre-treat (first stage) catalysts: the catalysts marketed by Albemarle under the NEBULA™ name have been shown to possess extraordinarily high activities in this service, as reported in "Debottlenecking Hydrocrackers with NEBULA™ Catalyst," Chitnis et al., NPRA Paper No. AM-05-66.

SUMMARY OF THE INVENTION

It has been found that a class of catalysts represented by the bulk multimetallic catalytic materials provides extremely good desulfurization activity when used as a post-treat desulfurization catalyst following a hydroconversion stage. In a single stage unit, the post-treat catalyst will normally be located as the final catalyst bed following the hydrocracking beds and, in a two-stage unit, as the final bed in the second stage (with the separators and water wash between the stages); in the two-stage unit, best results may be achieved from placement as the final bed following the hydrocracking beds, and it is possible to include an additional bed of the multimetallic catalyst as the last bed in the first stage.

In an embodiment, the invention relates to a hydrocracking process using a distillate sulfur-containing feedstock in which:

(a) the feedstock is subjected in a first hydrotreating step (pre-treat) in the presence of a hydrogen-containing treat gas in the presence of a hydrotreating catalyst; this first hydrotreating step contains one or more reaction zones in the form of catalyst beds with each reaction zone operated at hydrotreating conditions, to form a hydrotreated liquid product stream having a reduced sulfur and nitrogen content;

(b) the hydrotreated liquid product stream is passed directly (with or without separation) to a hydrocracking step containing one or more reaction zones in the form of catalyst beds; in this step the stream is subjected to hydroconversion in the presence of a hydrocracking catalyst;

(c) following the hydrocracking step, the hydrocracked effluent is passed directly to a post-treat hydrotreatment in which the liquid product is subjected to hydrotreating with a hydrodesulfurization catalyst which is a bulk multimetallic catalyst comprised of at least one Group VIII non-noble metal and at least two Group VIB metals in which the ratio of Group VIB metal to Group VIII non-noble metal is from about 10:1 to about 1:10.

In its application to two-stage hydrocrackers in which two successive hydroconversion steps are separated by an interstage water wash to remove ammonia from the gas stream and, optionally, an amine scrub to separate hydrogen sulfide, the bulk multimetallic catalyst is preferably disposed as the final catalyst directly following the hydrocracking catalyst beds in the second stage although some advantage may be achieved by its placement higher up in the second reactor as a result of the relatively lower nitrogen content of the material entering the second reactor. It may also be used as a post-treat catalyst directly following the initial hydroconversion stage.

It has been found, in laboratory experiments simulating hydrocracker post-treat operations (low N feeds at high pressures above 25 bar gauge ("barg") pressure (580 psig)), that the bulk multimetallic catalysts possess extremely high, diesel hydrodesulfurization activity under these conditions of higher pressure and low organic nitrogen content. The use of a layer of the multimetallic catalyst as a "drop-in" replacement in the post-treat zones allows production of ultra low sulfur diesel hydrocracker products as well as an acceptable naphtha for reformer feed. In particular, the catalyst has a high activity under these conditions for the removal of high-boiling point sulfur species, including sulfur species boiling above 650° F. (343° C.).

The Group VIII non-noble metal of the multimetallic catalyst is normally selected from Ni and Co and the Group VIB metal(s) from Mo and W. Preferably, two Group VIB metals are present as Mo and W and the ratio of Mo to W is about 9:1 to about 1:9.

DETAILED DESCRIPTION OF THE INVENTION

Hydrocracker Unit Configuration

Figure 1:
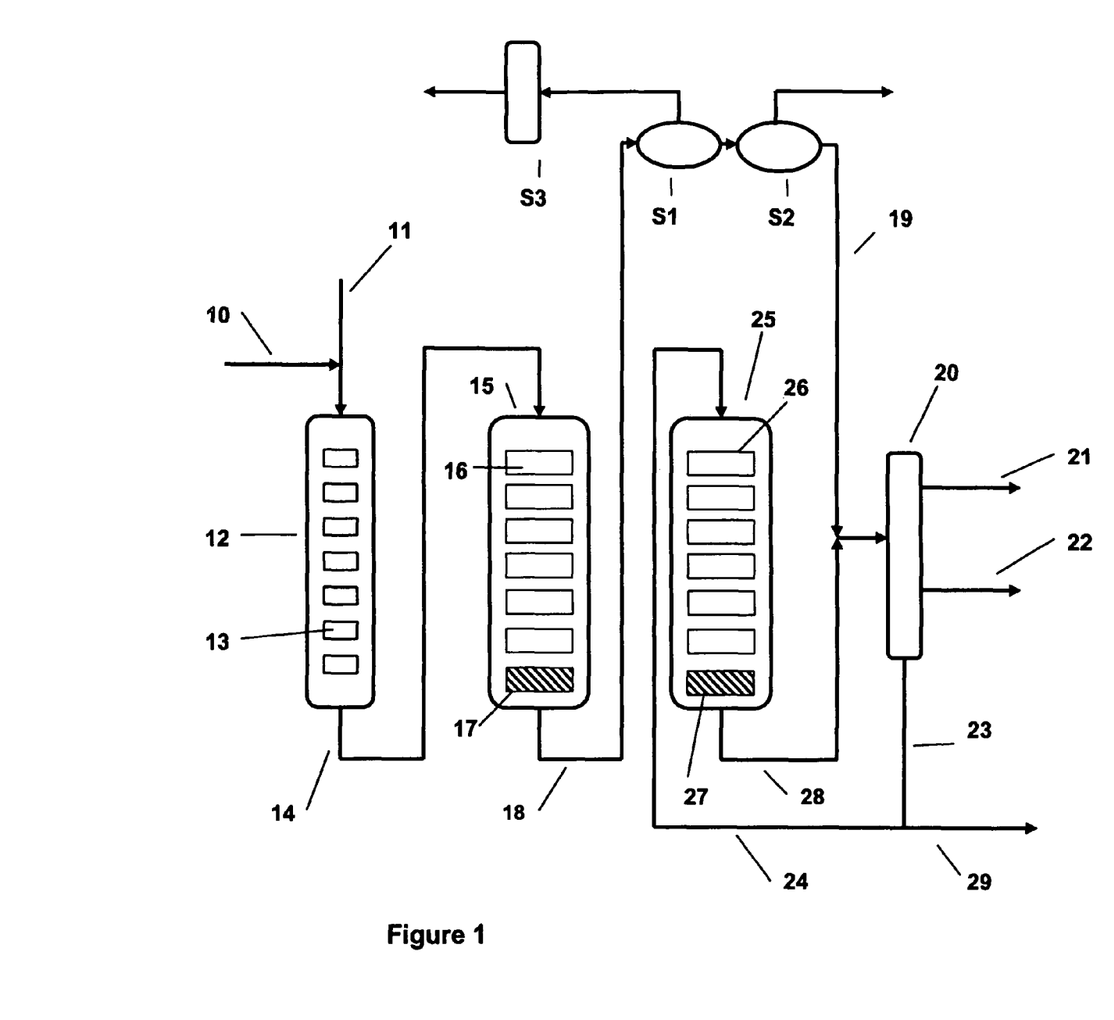
FIG. 1 is a simplified process schematic of a two stage hydrocracking unit showing the locations where the multimetallic catalysts may be used.

FIG. 1 shows an embodiment using a two-stage hydrocracker unit with three separate reactors. The two-stage unit shown has heteroatom disengagement means, such as an interstage water wash (to remove ammonia), and an optional amine scrub in the hydrogen recycle circuit to remove hydrogen sulfide. The number of reactors may be reduced to two by having the initial hydrotreating carried out in the same reactor as the first stage hydroconversion. Feed enters by way of line 10 and is joined by fresh and recycle hydrogen entering through line 11. The mixed phase flow stream enters first stage reactor 12 (R1), which contains a number of superimposed catalyst beds 13 of hydrotreating catalyst, each of which constitutes a reaction zone. The hydrotreated stream then passes through line 14 to the second reactor 15 (R2) which also contains a number of superimposed catalyst beds containing hydrocracking catalyst or catalysts. One of these beds is designated as bed 16. More than one type of hydrocracking catalyst may be used, depending upon the hydrocracking functionality required in this reactor. The bottom bed 17, however, contains a catalytically effective amount of the bulk multimetallic catalyst for more effective desulfurization with the objective of converting any recombinant mercaptans to inorganic sulfur.

From R2, the hydrocracked stream passes through high pressure separator S1 and low pressure separator S2 by way of line 19 to fractionator 20 in which it is separated into the desired product and recycle fractions with a light naphtha draw being made through line 21 and the heavy naphtha draw through line 22. An optional amine scrubber S3 may be used to remove hydrogen sulfide from the circulating gas stream. The heaviest components of the stream are withdrawn through line 23. A first portion is returned to the process as recycle and is sent to the inlet of the second stage reactor 25 (R3) by way of line 24. A second portion is a low sulfur diesel fuel withdrawn through line 29 and conducted away from the process.

The third reactor (R3) in which the second stage of the hydroconversion is carried out contains a number of superimposed beds 26 (one indicated) of hydrocracking catalyst or catalysts in a similar manner to R2. The bottom bed 27 contains the bulk multimetallic catalyst for the same purpose as in R2, namely to deal with recombinant mercaptan formation. If the optional amine scrubber is used, the bulk multimetallic catalyst may be placed higher in the reactor since the amount of hydrogen sulfide in the gas stream will be lower and the extent of recombinant mercaptan formation reduced correspondingly. From the outlet of R3 the hydrocracked, treated effluent passes through line 28 and enters fractionator 20 together with the second stage effluent from line 19. Fractionation takes place in fractionator 20 as described above to produce light and heavy naphtha fractions along with low sulfur road diesel as products.

Feedstocks

A wide range of petroleum and chemical feedstocks can be hydroprocessed in accordance with the present invention. Suitable feedstocks include whole and reduced petroleum crudes, atmospheric and vacuum residua, propane deasphalted residua, e.g., brightstock, cycle oils, FCC tower bottoms, gas oils, including atmospheric and vacuum gas oils and coker gas oils, light to heavy distillates including raw virgin distillates, hydrocrackates, hydrotreated oils, dewaxed oils, slack waxes, Fischer-Tropsch waxes, raffinates, naphthas, and mixtures of these materials. Typical lighter feeds would include distillate fractions boiling approximately from about 175° C. (about 350° F.) to about 375° C. (about 750° F.). With feeds of this type a considerable amount of hydrocracked naphtha is produced which can be used as a low sulfur gasoline blend stock. Typical heavier feeds would include, for example, vacuum gas oils boiling up to about 593° C. (about 1100° F.) and usually in the range of about 350° C. to about 500° C. (about 660° F. to about 935° F.) and, in this case, the proportion of diesel fuel produced is correspondingly greater.

In an embodiment, the process is operated by conducting the feedstock, which contains high levels of sulfur and nitrogen, to the initial hydrotreatment reaction stage to convert a substantial amount of the sulfur and nitrogen in the feed to inorganic form with a major objective in this step being a reduction of the feed nitrogen content. The hydrotreatment step is carried out in one or more reaction zones (catalyst beds), in the presence of hydrogen and a hydrotreating catalyst. The conditions used are appropriate to hydrodesulfurization and/or denitrogenation depending on the feed characteristics. The product stream is then passed directly (without separation) or with separation and a water wash to the hydrocracking zone in which boiling range conversion is effected. A bed of the bulk multimetallic catalyst may be provided after the initial hydroconversion step, typically at the bottom of the second reactor (R2). In a two-stage unit, the stream of liquid hydrocarbons from the first hydroconversion stage together with hydrogen treat gas and other hydrotreating/hydrocracking reaction products including hydrogen sulfide and ammonia passes to separators in which hydrogen, light ends, and inorganic nitrogen and hydrogen sulfide are removed from the hydrocracked liquid product stream. The recycle gas is washed to remove ammonia and may be subjected to an amine scrub to remove hydrogen sulfide in order to improve the purity of the recycled hydrogen and so reduce product sulfur levels. In the second stage hydroconversion the hydrocracking reactions are completed. A bed of the bulk multimetallic catalyst may be provided directly after the second hydroconversion stage, typically at the bottom of the third reactor (R3). The beds of bulk multimetallic catalyst are effective under R2 and/or R3 reaction conditions for the removal of "hard sulfur" species, i.e., sulfur species having atmospheric boiling points in the range of about 93° C. to about 593° C. (200° F. to about 1100° F.), particularly in the range of about 350° C. to about 500° C. (about 660° F. to about 935° F.).

Hydrotreating Catalysts

Conventional hydrotreating (hydrodesulfurization) catalysts may be used in the hydrodesulfurization stages in the first reactor. Typical conventional hydrodesulfurization catalysts for use in the present invention includes those that are comprised of at least one Group VIII metal, preferably Fe, Co or Ni, more preferably Co and/or Ni, and most preferably Co; and at least one Group VIB metal, preferably Mo or W, more preferably Mo, on a relatively high surface area support material, preferably alumina. Other suitable hydrodesulfurization catalyst supports include zeolites, amorphous silica-alumina, and titania-alumina Noble metal catalysts can also be employed, preferably when the noble metal is selected from Pd and Pt. More than one type of hydrodesulfurization catalyst be used in different beds in the same reaction vessel. The Group VIII metal is typically present in an amount ranging from about 2 to about 20 wt. %, preferably from about 4 to about 12 wt. %. The Group VIB metal will typically be present in an amount ranging from about 5 to about 50 wt. %, preferably from about 10 to about 40 wt. %, and more preferably from about 20 to about 30 wt. %. All metals weight percents are on support (percents based on the weight of the support).

Hydrocracking Catalysts

Examples of hydrocracking catalysts include nickel, nickel-cobalt-molybdenum, cobalt-molybdenum and nickel-tungsten and/or nickel-molybdenum, the latter two which are preferred. Non-limiting examples of noble metal catalysts include those based on platinum and/or palladium. Porous support materials which may be used for both the noble and non-noble metal catalysts comprise a refractory oxide material such as alumina, silica, alumina-silica, kieselguhr, diatomaceous earth, magnesia, or zirconia, with alumina, silica, alumina-silica being preferred and the most common. Zeolitic supports, especially the large pore faujasites such as USY can also be used.

A large number of hydrocracking catalysts are available from different commercial suppliers and may be used according to feedstock and product requirements; their functionalities may be determined empirically. The choice of hydrocracking catalyst is not critical. Any catalyst with the desired hydroconversion functionality at the selected operating conditions can be used, including conventional hydrocracking catalysts.

Bulk Multimetallic Catalyst

The hydrotreating catalyst of the post-treat zones at the bottom of R3 and optionally R2 is a bulk multimetallic catalyst, i.e., it is not a supported catalyst though it can contain binder. The catalyst comprises at least one Group VIB metal and at least one Group VIII metal. Preferably, the catalyst is comprised of at least one Group VIII non-noble metal and at least two Group VIB metals and in which the ratio of Group VIB metal to Group VIII non-noble metal is from about 10:1 to about 1:10. It is preferred that the catalyst be a bulk trimetallic catalyst comprised of one Group VIII non-noble metal, preferably Ni or Co and the two Group VIB metals Mo and W. It is preferred that the ratio of Mo to W be about 9:1 to about 1:9.

The preferred multimetallic catalysts are bulk trimetallic catalyst compositions represented by the formula:

where X is one or more Group VIII non-noble metal, and the molar ratio of b:(c+d) is 0.5/1 to 3/1, preferably 0.75/1 to 1.5/1, more preferably 0.75/1 to 1.25/1. The molar ratio of c:d is preferably >0.01/1, more preferably >0.1/1, still more preferably 1/10 to 10/1, and yet more preferably 1/3 to 3/1; the most preferred ratio is for substantially equimolar amounts of Mo and W, e.g., 2/3 to 3/2; and z=[2b+6 (c+d)]/2. The catalyst composition which has been found to give good performance and was used in the Examples below is one having the composition, in the oxide form, $Ni_{1.5}W_{0.5}Mo_{0.5}O_{4.5}$. In operation, the catalyst is generally in the equivalent sulfided form.

The essentially amorphous material preferably has a unique X-ray diffraction pattern showing crystalline peaks at d=2.53 Ångstroms and d=1.70 Ångstroms.

The bulk mutimetallic catalysts are described in a number of patents to which reference is made for a description of them, their preparation and use in other processes; these patents include the following: U.S. Pat. No. 6,635,599; U.S. Pat. No. 6,156,695; U.S. Pat. No. 6,299,760; U.S. Pat. No. 6,162,350; U.S. Pat. No. 6,582,590; U.S. Pat. No. 6,620,313; U.S. Pat. No. 6,758,963; WO 00/42125, which include examples of the preparation of these catalysts by different synthetic procedures.

The bulk multimetallic catalyst may be composited with a binder in a similar manner to conventional hydrocracking and other catalysts. If a binder material is used in the preparation of the catalyst composition it can be any material useful as a binder in hydroprocessing catalysts, including conventional binder material. Examples include silica, silica-alumina, such as conventional silica-alumina, silica-coated alumina and alumina-coated silica, alumina such as (pseudo)boehmite, or gibbsite, titania, zirconia, cationic clays or anionic clays such as saponite, bentonite, kaoline, sepiolite or hydrotalcite, or mixtures thereof. Preferred binders are silica, silica-alumina, alumina, titanic, zirconia, or mixtures thereof. These binders may be applied as such or after peptization. It is also possible to apply precursors of these binders that, during the process of the invention are converted into any of the above-described binders. Suitable precursors are, e.g., alkali metal aluminates (to obtain an alumina binder), water glass (to obtain a silica binder), a mixture of alkali metal aluminates and water glass (to obtain a silica alumina binder), a mixture of sources of a di-, tri-, and/or tetravalent metal such as a mixture of water-soluble salts of magnesium, aluminum and/or silicon (to prepare a cationic clay and/or anionic clay), chlorohydrol, aluminum sulfate, or mixtures thereof.

If desired, the binder material may be composited with a Group VIB metal and/or a Group VIII non-noble metal, prior to being composited with the bulk catalyst composition and/or prior to being added during its preparation. Compositing the binder material with any of these metals may be carried out by impregnation of the solid binder with these materials, e.g., according to conventional impregnation techniques. If the binder is peptized, it is also possible to carry out the peptization in the presence of Group VIB and/or Group VIII non-noble metal components.

If alumina is applied as binder, the surface area preferably lies in the range of about 100 to about 400 m$^2$/g, and more preferably about 150 to about 350 m$^2$/g, measured by the B.E.T. method. The pore volume of the alumina is preferably in the range of about 0.5 to about 1.5 nd/g measured by nitrogen adsorption.

In an embodiment, the binder material has less catalytic activity than the bulk catalyst composition or no catalytic activity at all. Consequently, by adding a binder material, the activity of the bulk catalyst composition may be reduced. Therefore, the amount of binder material to be added in the process of the invention generally depends on the desired activity of the final catalyst composition. Binder amounts from about 0 wt. % to about 95 wt. % of the total composition can be suitable, depending on the envisaged catalytic application. However, to take advantage of the resulting unusual high activity of the composition of the present invention, binder amounts to be added are generally in the range of about 0.5 wt. % to about 75 wt. % of the total composition.

The catalyst composition can be directly shaped. Shaping comprises extrusion, pelletizing, beading, and/or spray drying. It must be noted that if the catalyst composition is to be applied in slurry type reactors, fluidized beds, moving beds, expanded beds, or ebullating beds, spray drying or beading is generally applied for fixed bed applications, generally, the catalyst composition is extruded, pelletized and/or beaded. In the latter case, prior to or during the shaping step, any additives that are conventionally used to facilitate shaping can be added. These additives may comprise aluminum stearate, surfactants, graphite or mixtures thereof. These additives can be added at any stage prior to the shaping step. Further, when alumina is used as a binder, it may be desirable to add acids prior to the shaping step such as nitric acid to increase the mechanical strength of the extrudates.

It is preferred that a binder material is added prior to the shaping step. Further, it is preferred that the shaping step is carried out in the presence of a liquid, such as water. Preferably, the amount of liquid in the extrusion mixture, expressed as LOI is in the range of about 20% to about 80%.

The resulting shaped catalyst composition can, after an optional drying step, be optionally calcined although calcination is not essential. If a calcination is carried out in the process of the invention, it can be done at a temperature of, e.g., from about 100° C. to about 600° C. and preferably about 350° C. to about 500° C. for a time varying from about 0.5 to about 48 hours. The drying of the shaped particles is generally carried out at temperatures above 100° C.

The catalyst composition is preferably subjected to spray drying, (flash) drying, milling, kneading, or combinations thereof prior to shaping. These additional process steps can be conducted either before or after a binder is added, after solid-liquid separation, before or after calcination and subsequent to re-wetting. It is believed that by applying any of the above-described techniques of spray drying, (flash) drying, milling, kneading, or combinations thereof, the degree of mixing between the bulk catalyst composition and the binder material is improved. This applies to both cases where the binder material is added before or after the application of any of the above-described methods. However, it is generally preferred to add the binder material prior to spray drying and/or any alternative technique. If the binder is added subsequent to spray drying and/or any alternative technique, the resulting composition is preferably mixed thoroughly by any conventional technique prior to shaping. An advantage of, e.g., spray drying is that no wastewater streams are obtained when this technique is applied.

The bulk multimetallic catalysts may be subjected to sulfidation prior to use. Sulfidation is generally carried out by contacting the catalyst composition or precursors thereof with a sulfur containing compound such as elementary sulfur, hydrogen sulfide or polysulfides. The sulfidation can generally be carried out subsequently to the preparation of the bulk catalyst composition but prior to the addition of a binder material, and/or subsequently to the addition of the binder material but prior to subjecting the catalyst composition to spray drying and/or any alternative method, and/or subsequently to subjecting the composition to spray drying and/or any alternative method but prior to shaping, and/or subsequently to shaping the catalyst composition. It is preferred that the sulfidation is not carried out prior to any process step that reverts the obtained metal sulfides into their oxides. Such process steps are, e.g., calcination or spray drying or any other high temperature treatment in the presence of oxygen. Consequently, if the catalyst composition is subjected to spray drying and/or any alternative technique, the sulfidation should be carried out subsequent to the application of any of these methods. The decomposed precursor can also be sulfided or pre-sulfided by a variety of known methods. For example, the decomposition product can be contacted with a gas comprising $H_2S$ and hydrogen, e.g., 10% $H_2S/H_2$, at elevated temperatures for a period of time sufficient to sulfide the decomposition product, usually at the point of $H_2S$ breakthrough in the exit gas. Sulfiding can also be effected in situ by passing a feedstock containing sulfur over the decomposition product.

Additionally to, or instead of, a sulfidation step, the bulk catalyst composition may be prepared from at least one metal sulfide. If, e.g., the catalyst is prepared by the solid route (see patents referred to above) is applied in step, the bulk catalyst component can be prepared form nickel sulfide and/or molybdenum sulfide and/or tungsten sulfide.

If the catalyst composition is used in a fixed bed processes, the sulfidation is preferably carried out subsequent to the shaping step and, if applied, subsequent to the last calcination step. Preferably, the sulfidation is carried out ex situ, i.e., the sulfidation is carried out in a separate reactor prior to loading the sulfided catalyst composition into the hydroprocessing unit. It is preferred that the catalyst composition is both sulfided ex situ and in situ.

The bulk multimetallic catalyst particles are preferably sinter-resistant. Thus the active surface area of the bulk catalyst particles is maintained during use. The molar ratio of Group VIII to Group VIII non-noble metals ranges generally from about 10:1 to about 1:10 and preferably from about 3:1 to about 1:3. In the case of a core-shell structured particle, these ratios of course apply to the metals contained in the shell. If more than one Group VIB metal is contained in the bulk catalyst particles, the ratio of the different Group VIB metals is generally not critical. The same holds when more than one Group VIII non-noble metal is applied. In the case where molybdenum and tungsten are present as Group VIB metals, the molybenum:tungsten ratio preferably lies in the range of about 9:1 to about 1:9. Preferably the Group VIII non-noble metal comprises nickel and/or cobalt. It is further preferred that the Group VIB metal comprises a combination of molybdenum and tungsten. Preferably, combinations of nickel/molybdenum/tungsten and cobalt/molybdenum/tungsten and nickel/cobalt/molybdenum/tungsten are used. These types of precipitates appear to be sinter-resistant, resulting in the active surface area of the precipitate being retained during use.

The metals are preferably present as oxidic compounds of the corresponding metals, or if the catalyst composition has been sulfided, sulfidic compounds of the corresponding metals.

The catalyst particles preferably have a surface area of at least 50 m$^2$/g and more preferably of at least 100 m$^2$/g measured by the B.E.T. method. It is furthermore preferred that the particles comprise about 50 to about 100 wt. %, and even more preferably about 70 to about 100 wt. % of at least one Group VIII non-noble metal and at least one Group VIB metal, based on the total weight of the particles, calculated as metal oxides. The amount of Group VIB and Group VIII non-noble metals can easily be determined by TEM-EDX.

The pore size distribution of the particles of the bulk multimetallic catalyst is approximately the same as the one of conventional hydrotreating catalysts. In particular, these particles have preferably a pore volume of about 0.05 to about 5 ml/g, more preferably of about 0.1 to about 4 ml/g, still more preferably of about 0.1 to about 3 ml/g and most preferably about 0.1 to about 2 ml/g determined by nitrogen adsorption. Preferably, pores smaller than 1 nm are not present. Furthermore, these particles preferably have a median diameter of at least about 50 µm, more preferably at least about 100 nm, and preferably not more than about 5000 µm and more preferably not more than about 3000 µm. Even more preferably, the median particle diameter lies in the range of about 0.1 to about 50 µm and most preferably in the range of about 0.5 to about 50 µm.

The surface area of the multimetallic catalyst preferably is at least about 40 m$^2$/g, more preferably at least about 80 m$^2$/g and most preferably at least about 120 m$^2$/g. The total pore volume of the catalyst composition is preferably at least about 0.05 ml/g and more preferably at least about 01 ml/g as determined by water porosimetry. To obtain catalyst compositions with high mechanical strength, it may be desirable that the catalyst composition of the invention has a low macroporosity.

In an embodiment, the bulk multimetallic catalyst particles have a characteristic X-ray diffraction pattern which differs from catalysts obtained by co-mixing and conventional hydroprocessing catalysts obtained by impregnation. The X-ray diffraction pattern of the bulk catalyst particles comprises, and preferably essentially consists of, peaks characteristic to the reacted metal components. If, e.g., nickel hydroxy-carbonate has been contacted with a molybdenum and tungsten component as described above, the resulting bulk catalyst particles are characterized by an X-ray diffraction pattern which comprises peaks at d values of (4.09), 2.83, 2.54, 2.32, 2.23, 1.71, (1.54), 1.47. Values in brackets indicate that the corresponding peaks are rather broad and/or have a low intensity or are not distinguished at all. The term "the X-ray diffraction pattern essentially consists of" these peaks means that apart from these peaks, there are essentially no further peaks or significant features contained in the diffraction pattern. The precipitate for catalyst obtained by the solution route has a characteristic X-ray diffraction pattern which differs from catalyst obtained by co-mixing and conventional hydroprocessing catalysts obtained by impregnation. For instance the X-ray diffraction pattern of a Ni—Mo—W precipitate as prepared by the solution route has peaks at d values of 2.52, 1.72 and 1.46.

Reaction Conditions

The present process for treating the hydrocracked effluents is based in part upon the discovery that the multimetallic catalysts have an extraordinary hydrodesulfurization rate constant at high pressures, typically above about 25 barg, with the improvement in activity compared to conventional catalysts becoming especially notable at pressures (total system pressure) above 40 barg. This improvement, which is shown in the Example below, enables the hydrocracked effluent to be effectively subjected to a desulfurization to remove recombinant mercaptans as well as other sulfur species which have passed through the earlier high conversion stages.

The hydrocracking catalysts and the bulk multimetallic catalyst composition used in post-treat zones, can be used under hydrocracking conditions typically at temperatures of from about 200° C. to about 450° C., hydrogen pressures of from about 5 barg to about 300 barg, liquid hourly space velocities of from about 0.05 h$^{-1}$ to about 10 h$^{-1}$ and hydrogen treat gas rates of from about 40 m$^3$/m$^3$ to about 1800 m$^3$/m$^3$ (about 250 SCF/B to about 11,400 SCF/B). Typically, in most cases, the conditions will have temperatures in the range of about 300° C. to about 450° C., hydrogen pressures of from about 30 barg to about 150 barg, liquid hourly space velocities of from about 0.5 h$^{-1}$ to about 2 h$^{-1}$ and hydrogen treat gas rates of from about 200 m$^3$/m$^3$ to about 930 m$^3$/m$^3$ (about 1285 SCF/B to about 6000 SCF/B). Depending on the other catalysts and the choice of reaction conditions, the products of the process may show improved viscosities, viscosity indices, saturates content, low temperature properties, volatilities and depolarization. The reactors can also be operated in any suitable catalyst-bed arrangement mode, for example, fixed bed, slurry bed, or ebulating bed although fixed bed, co-current downflow is normally utilized.

Process conditions applicable for the use of the catalysts may vary depending on the feedstock to be treated. The notable feature of the present multimetallic catalysts in this post-treat service is concerned is that the hydrodesulfurization activity increases markedly at higher pressures, typically at pressures of at least about 25 barg (all pressures reported in this specification are gauge pressures) with optimum pressures being at least about 40 barg. Temperatures will be in the normal range for post-treat HDT temperatures, dictated mainly by the prior processing conditions, especially the exotherm during the hydrocracking steps in which significant hydrogenation is taking place. Temperatures typically will be from about 100° C. to about 450° C. (about 210° F. to about 850° F.) and, in most cases, from about 200° C. to about 400° C. (about 390° F. to about 750° F.). Space velocity on the post-treat catalyst will normally be about 0.2 v/v/hr to about 10 v/v/hr and, usually will be in the range from about 0.5 v/v/hr to about 5 v/v/hr and in most cases from about 0.8 v/v/hr to about 2.0 v/v/hr. It has been found, however, that the present bulk multimetallic catalysts exhibit more marked hydrodesulfurization and hydrodenitrogenation activity at space velocities above about 1.0 and even at values above about 1.5; advantages may therefore be attained by operating at space velocities on the multimetallic catalyst of about 1.0 v/v/hr to about 2.0 v/v/hr. Hydrogen circulation rate on the all stages of the hydrocracker will depend on the feed and the desired product properties with the ultra-low sulfur products requiring a higher circulation rate than those where a higher sulfur level can be tolerated. Hydrogen circulation rate will normally be from about 100 m$^3$ m$^3$ to about 1,000 m$^3$ m$^3$ in most cases from about 300 m$^3$ m$^3$ to about 500 m$^3$ m$^3$.

The location of the post-treat catalyst is significant since it has been found that the enhanced hydrodesulfurization activity requires a denitrogenated feed such as that from the second or third stage hydrocracking steps, i.e., the steps in which significant boiling range conversion (more than about 25% v/v combined) takes place with concomitant conversion of organic nitrogen to inorganic form. While the advantages may be perceived when the post-treat catalyst is used only after the initial hydroconversion step in a two-stage process, the degree of desulfurization is more marked when the post-treat is carried out following the final conversion stage and the feed has been more thoroughly denitrogenated. For best results, the total nitrogen content of the feed to the multimetallic catalyst should be not more than about 100 ppmw and, for better results, about 50 ppmw with less than about 25 ppmw preferred. Basic nitrogen should be held below about 100 ppmw with, again about 50 ppmw and about 25 ppmw, representing progressively better controls on this contaminant.

In an embodiment, the effluent from the final stage is a low-sulfur distillate, where about 90% of the distillate on a volume basis boils below about 750° F. (about 400° C.). For example, the final stage effluent has atmospheric boiling point characteristics in conformity with ASTM D86 (90% recovered at 640° F. max.), and with specifications requiring a 95% volume boiling at 380° C. or less. Sulfur content is about 50 ppmw or less, preferably about 15 ppmw or less, and more preferably about 10 ppmw or less.

In an embodiment, the middle distillate fraction from the final stage will normally have a sulfur content of no more than about 50 ppmw and in favorable cases, no more than about 15 or 10 ppmw (ASTM D5453), making this a suitable blend component for low sulfur road diesel fuel meeting the most stringent current regulatory regimes. The distillate products can, therefore, be used for making road diesel fuels conforming to the following ASTM specification D975-05 No. 1-D S15 and D975-05 No. 2-D S15 and other similar low sulfur diesel fuel oil specifications. Accordingly, the distillate products can be used to make light middle distillate fuels (SimDis ASTM D2887, 90 vol. % recovered at 288° C. max., flash point D93, 38° C. min.) or distillate fuel oils (SimDis ASTM D2887, 90 vol. % recovered at 338° C. max., flash point D93, 52° C. min.) In more general terms, the middle distillate fractions which may be recovered from the present process will typically have a flash point to conform to the applicable market specifications such as the D93 and D2887 specifications mentioned above or similar, such as ASTM D86. Good cetane ratings will normally be obtained as a result of the extensive degree of hydrogenation that has taken place; blending to final product cetane numbers of at least 40 (D613) and cetane indices of at least 40 is readily feasible. Aromatics content is also low; the multimetallic catalysts used on the denitrogenated feeds are capable of producing distillate diesel products conforming to the ASTM D975 limits of 35% by volume (D1319); compliance with lower regulatory regimes such as CARB low aromatics diesel (10% vol.) might at some cost be achieved since the catalysts possess good hydrogenation functionality, it will normally be preferable for economic reasons to make a product such as CARB alternative low aromatics diesel (ALAD), typically with about 25-26 vol. % aromatics.

Example 1

Three catalysts were evaluated for suitability as hydrocracker post-treat hydrotreat catalysts. The catalysts were two commercially available HDT catalysts, a medium activity NiMo on alumina catalyst, identified as Catalyst A, and a high activity NiMo on alumina catalyst, identified as Catalyst B, as well as a bulk CoNiMo multimetallic catalyst having the composition $Ni_{1.5}WO_{0.5}Mo_{0.5}O_{4.5}$. The catalysts were evaluated at various pressures for their hydrotreating activity when used with a de-nitrogenated feed representative of a third-stage hydrocracker effluent. This feed used in this Example was a nitrogen-depleted distillate fraction having an API Gravity of 28, a sulfur content of 15910 ppmw and a total nitrogen content of 19.3 ppm produced by passing a distillate fraction set out in Table 1 (Raw CHD Feed) below over a bed of mixed acidic, macroreticular base exchange catalyst (sulfonic acid functionality) (Amberlyst-15™) with alumina. The sulfur analysis of the treated, nitrogen-depleted feed is given in Table 2 below.

TABLE 1

Feed Properties

| | Raw CHD Feed | Untreated CHD Product | Virgin Distillate Feed |
|---|---|---|---|
| Gravity, API | 28.0 | 32.1 | 35.6 |
| Total S, ppm | 17220 | 439 | 9320 |
| Total N, ppm | 373 | 241 | 79 |
| S Typing | | | |
| Thiophenes, ppm | 322 | 0 | 33 |
| Benzohiophenes, ppm | 7789 | 2 | 4458 |
| Non-BetaDBTs, ppm | 2365 | 69 | 864 |
| DBT alone, ppm | 388 | 0 | 185 |
| Beta DBTs, ppm | 1643 | 75 | 894 |
| 4-Me DBT alone, ppm | 394 | 12 | 300 |
| Di-beta DBTs, ppm | 605 | 185 | 346 |
| 4,6-DiMe DBT alone, ppm | 154 | 66 | 141 |
| 3 &4 ring unassigned, ppm | 347 | 58 | 213 |
| Total S by S Typing, ppm | 13078 | 389 | 6809 |

TABLE 2

N-Depleted CHD Feed

| | |
|---|---|
| Gravity, API | 32.6 |
| Total S, ppm | 15910 |
| Total N, ppm | 19 |
| S Typing | |
| Thiophenes, ppm | 150 |
| Benzohiophenes, ppm | 7484 |
| Non-BetaDBTs, ppm | 2095 |
| DBT alone, ppm | 356 |
| Beta DBTs, ppm | 1545 |
| 4-Me DBT alone, ppm | 372 |
| Di-beta DBTs, ppm | 574 |
| 4,6-DiMe DBT alone, ppm | 148 |
| 3 &4 ring unassigned, ppm | 320 |
| Total S by S Typing, ppm | 12188 |

The three catalysts were tested at pressures of 10.35, 27.60 and 44.80 barg (150, 400, 650 psig) total system pressure to determine the hydrodesulfirization rate constants with the N-depleted feed at these pressures. The testing was carried out in a continuous flow, single reactor unit fitted with delivery pumps, flow meters to control the hydrogen treat gas which is mixed with the liquid feed and then flowed through the catalyst bed in up-flow mode. The liquid and gas products from the reactors were separated in product accumulators with a pressure controller to control back-end pressure. An online gas chromatograph measured the exit gas compositions. Product liquid was stripped with nitrogen for two hours to remove dissolved hydrogen sulfide and the sulfur and nitrogen concentration is in the product analyzed by an Antek™ analyzer.

The reactors were run at temperatures of 343° C. (650° F.) and at a space velocity, LHSV (v/v/hr), of 0.83 at 10.35 and 27.60 barg and 1.67 at 44.80 barg. Treat gas ratio was held at 2 in all cases.

The first order hydrodesulfurization rate constants were calculated using the kinetic equation:

$$k_{HDS} = LHSV * \ln(S_{feed}/S_{product})$$

Figure 2:
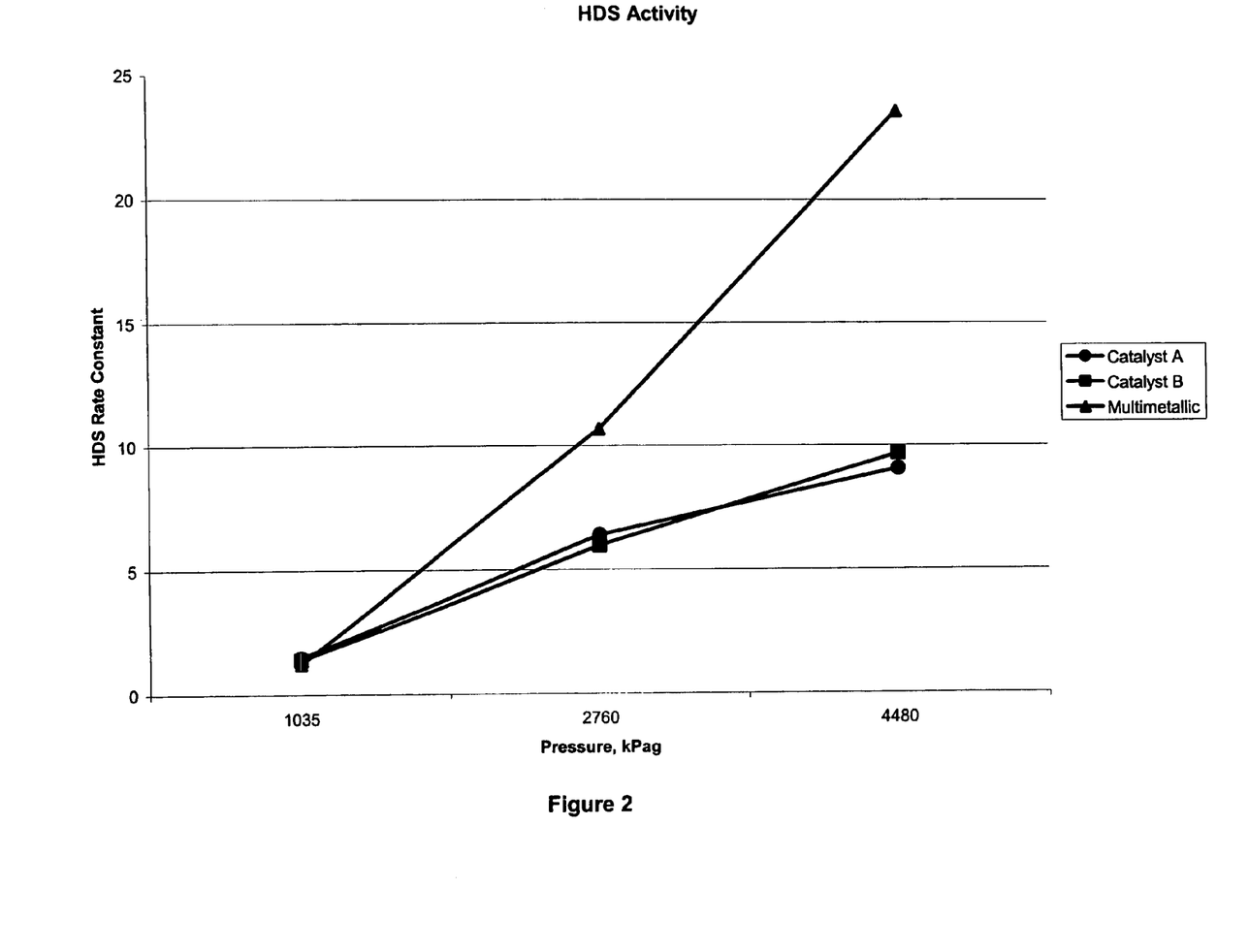
FIG. 2 is a graphical representation of the first order rate constants for hydrodesulfurization for the bulk multimetallic catalysts on feeds depleted in organic nitrogen at varying pressures.

The HDS rate constants are shown in Table 3 below and graphically in FIG. 2.

TABLE 3

HDS Rate Constants, N-Depleted Feed

| | HDS Rate Constants | | |
|---|---|---|---|
| Pressure, barg, total | 10.35 | 27.60 | 44.80 |
| Catalyst A | 1.47 | 6.37 | 9.05 |
| Catalyst B | 1.39 | 5.95 | 9.67 |
| Multimetallic | 1.22 | 10.67 | 23.55 |

The results show that the bulk multimetallic catalyst is strikingly more active than the conventional HDT catalysts, especially at the higher pressures, for which reason it is preferred to operate the present post-treat catalysts at system pressures above a minimum of about 25 barg with higher pressures above 40 barg being optimal. Pressures of this magnitude will frequently prevail in the final stage or second stage of fuels hydrocrackers and so the present post-treat catalysts can be used without problems arising from unusual demands on the reactor and ancillary equipment.

Example 2

Three same three catalysts evaluated in Example 1 were also evaluated with feeds of differing nitrogen content and nitrogen type.

A feed with basic nitrogen removed but with retained non-basic nitrogen was made by treating the Raw CHD Feed of Table 1 above with 90% acetic acid. Nitrogen typing results indicated that the treatment selectively removed basic nitrogen compounds such as light N species, anilines and indoles, to give a product containing 16320 ppm sulfur and 154 ppm nitrogen. A feed containing basic nitrogen but with a reduced total nitrogen content was produced by extraction of the Raw CHD Feed of Table 1 with 20% NaOH and 9% Bu$_4$OH aqueous caustic solution, to give a product containing 16950 ppm sulfur and 129 ppm nitrogen.

The three catalysts were evaluated at various pressures for their hydrotreating activity when used with these two extracted feeds, the N-depleted feed of Example 1 and the raw CHD Feed of Table 1, using the same unit and conditions. The results are given in Table 4 below. The results show that the pressure affects each catalyst to a different degree with the feeds of different nitrogen level and type. HDS activity promotion by N removal is more pronounced when the N was depleted in the feed, especially at high pressure. At the highest pressure (44.8 barg, 650 psig), the HDS activity of the multimetallic catalyst with the N depleted feed is 8.5 times as great as with the basic N containing feed. HDS on the non-basic N feed showed marginally better performance than on basic N containing feed, with a 10 to 30% increase in activity relative to the basic N feed. At the lowest pressure (10.35 barg, 150 psig), the advantage of using a non-basic N over basic N containing feed in HDS activity diminished.

TABLE 4

Comparison of HDS Performance on Treated and Raw Feeds

| Catalyst | Pressure, barg | N-Depleted Feed S = 15910 ppm N = 19.3 ppm | | Non-basic N Feed S = 16320 ppm N = 154 ppm | |
|---|---|---|---|---|---|
| | | $K_{HDS}$ | S removal % | $K_{HDS}$ | S removal % |
| Catalyst A | 44.80 | 9.05 | 99.5 | 3.04 | 95.4 |
| | 27.60 | 6.37 | 99.7 | 2.61 | 98.8 |
| | 10.35 | 1.47 | 96.2 | 0.96 | 93.6 |
| Catalyst B | 44.80 | 9.67 | 99.6 | 3.53 | 94.8 |
| | 27.60 | 5.95 | 99.7 | 3.16 | 99.1 |
| | 10.35 | 1.39 | 95.9 | 0.91 | 93.1 |
| Multimetallic | 44.80 | 23.55 | 99.9 | 3.62 | 96.8 |
| | 27.60 | 10.67 | 99.9 | 2.92 | 98.9 |
| | 10.35 | 1.22 | 94.6 | 0.70 | 90.0 |

| Catalyst | Pressure, barg | Basic N Feed S = 16950 ppm N = 128.7 ppm | | Raw CHD Feed S = 17220 ppm N = 373 ppm | |
|---|---|---|---|---|---|
| | | $K_{HDS}$ | S removal % | $K_{HDS}$ | S removal % |
| Catalyst A | 44.80 | 2.32 | 97.0 | 2.10 | 94.6 |
| | 27.60 | 1.76 | 97.6 | | |
| | 10.35 | 0.86 | 91.2 | | |
| Catalyst B | 44.80 | 2.18 | 97.5 | 1.92 | 93.8 |
| | 27.60 | 1.57 | 97.1 | | |
| | 10.35 | 0.75 | 90.0 | | |
| Multimetallic | 44.80 | 2.77 | 97.6 | 2.04 | 94.4 |
| | 27.60 | 2.21 | 98.3 | | |
| | 10.35 | 0.75 | 89.4 | | |

Example 3

The performance of the same three catalysts in terms of hydrogenation capability was investigated with the same test rig, using as feeds, the Untreated CHD Product and the Virgin Distillate Feed, both as shown in Table 1. The Untreated CHD Product was hydroprocessed at 343° C. (650° F.), 41.4 barg (600 psig) and two runs were made, one at 0.83 v/v/hr LHSV using a hydrogen:oil ratio of 316 m$^3$ m$^3$ (2000 SCF/Bbl) and a second run at LHSV of 1.67 v/v/hr and a hydrogen:oil ratio of 158 m$^3$ m$^3$ (1000 SCF/Bbl). The Virgin Distillate Feed was treated at 330° C. (625° F.), a hydrogen:oil ratio of 316 m$^3$m$^3$ (2000 SCF/Bbl), at three different pressures and two space velocities (1.67, 0.97). The results are given below in Tables 5 and 6 below.

TABLE 5

Catalyst Performance on CHD Product (Total N 241 ppm)

| | Catalyst | | | | | |
|---|---|---|---|---|---|---|
| | Catalyst A | | Multimetallic | | Catalyst B | |
| | LHSV 0.83 | LHSV 1.67 | LHSV 0.83 | LHSV 1.67 | LHSV 0.83 | LHSV 1.67 |
| $k_{HDS}$(1st order) | 3.64 | 2.92 | 3.7 | 4.72 | 3.41 | 3.66 |
| $k_{HDN}$(1st order) | 4.34 | 3.09 | 4.54 | 5.21 | 4.51 | 4.56 |
| S removal, % | 98.5 | 82.8 | 99 | 94 | 97.8 | 88.5 |
| N removal, % | 99.4 | 83.8 | 99.6 | 95.4 | 99.5 | 92.5 |

TABLE 6

Catalyst Performance on Virgin Distillate Feed (Total N 79 ppm)

| | Catalyst | | | | | | | | |
|---|---|---|---|---|---|---|---|---|---|
| | Catalyst A | | | Multimetallic | | | Catalyst B | | |
| Pressure, barg | 41.4 | 27.6 | 10.3 | 41.4 | 27.6 | 10.3 | 41.4 | 27.6 | 10.3 |
| LHSV, hr$^{-1}$ | 1.67 | 0.97 | 0.97 | 1.67 | 0.97 | 0.97 | 1.67 | 0.97 | 0.97 |
| $k_{HDS}$(1.5 order) | 5.62 | 4.46 | 2.44 | 17.45 | 11.17 | 2.77 | 6.80 | 5.50 | 2.10 |
| $k_{HDN}$(1st order) | 5.36 | 1.86 | 0.45 | 7.30 | 4.09 | 0.66 | 6.72 | 3.48 | 0.54 |
| S removal, % | 98.3 | 99.0 | 96.9 | 99.8 | 99.8 | 97.5 | 98.7 | 99.3 | 96.1 |
| N removal, % | 96 | 87 | 34 | 99 | 99 | 51 | 98 | 98 | 39 |

The results reported in Tables 5 and 6 show that the multimetallic catalysts, when used in hydrocracker post-treat service with a feed of controlled nitrogen content, are considered capable of producing distillate product fractions which will meet not only low sulfur diesel specifications. The distillate product fractions have also been found to have low levels of residual aromatics, including the low levels of the polynuclear aromatics which are important for achieving the cetane indices specified for the S15 diesel fuels. As shown by the divergent results for the CHD Product at 241 ppm N and the Virgin Distillate at 79 ppm, the lower nitrogen content which will be encountered in the hydrocracker following the third stage, is a material factor in achieving both low sulfur and low residual aromaticity.

The invention claimed is:

1. A hydrocracking process for converting a feed of petroleum origin to lower boiling products of higher gravity and low sulfur content, which process comprises:
   (i) hydrotreating a hydrocarbon feed having a sulfur content greater than about 3,000 wppm in the presence of a hydrogen-containing treat gas in a hydrotreating step containing one or more reaction zones, to produce a hydrotreated effluent stream containing liquid products having a sulfur and nitrogen content less than that of the feed;
   (ii) passing the liquid product stream of the hydrotreatment step directly to a hydrocracking step containing one or more reaction zones in which die liquid product stream is hydrocracked in the presence of a hydrogen-containing treat gas to reduce its boiling range and produce an effluent comprising hydrocracked liquid products having a nitrogen content of not more than about 100 wppm and gas comprising hydrogen, ammonia and hydrogen sulfide;
   (iii) passing the effluent of the hydrocracking step directly without separation of the liquid products from the gas, to a post-treat hydrodesulfurization zone located in the same reactor as at least one reaction zone of the hydrocracking step, in which the hydrocracked liquid product is hydrodesulfurized in the presence of a hydrogen-containing treat gas and a hydrodesulfurization catalyst comprising a bulk multimetallic catalyst to produce a hydrocracked, hydrodesulfurized liquid product stream having a sulfur content of less than about 100 wppm sulfur,
   wherein the post-treat hydrodesulfurization step is carried out at a total system pressure of at least about 25 barg, and wherein the bulk multimetallic catalyst is comprised of one Group VIII non-noble metal and two Group VIB metals and in which the ratio of Group VIB metal to Group VIII non-noble metal is from about 10:1 to about 1:10, and is represented by the formula: $(X)_b(Mo)_c(W)_dO_z$ in which X is one or more of a Group VIII non-noble metal, and the molar ratio of b:(c+d) is 0.5/1 to 3/1.

2. A process according to claim 1 in which the ammonia is removed from the hydrotreated effluent stream and the hydrotreated liquid products are then passed to a hydrocracking stage containing one or more reaction zones in which the liquid product stream is hydrocracked in the presence of hydrogen-containing treat gas to reduce its boiling range and produce a hydrocracked effluent stream comprising a hydrocracked liquid product stream and a gas stream gas comprising hydrogen, ammonia and hydrogen sulfide which is passed without, separation of the liquid products from the gas to the post-treat hydrodesulfurization zone in which the hydrocracked liquid product steam is hydrodesulfurized in the presence of the second gas stream and the bulk multimetallic catalyst.

3. The process of claim 1 in which the Group VIII non-noble metal is selected Ni and the Group VIB metals are Mo and W.

4. The process of claim 1 in which the molar ratio of b:(c+d) is 0.75:1 to 1.5:1.

5. The process of claim 1 in which the molar ratio of c:d is less than 0.01:1.

6. The process of claim 1 in which the bulk multimetallic catalyst is comprised of at least one Group VIII non-noble metal and at least two Group VIB metals and in which the ratio of Group VIB metal to Group VIII non-noble metal is from about 10:1 to about 1:10, and is essentially an amorphous material having a unique X-ray diffraction pattern showing crystalline peaks at d=2.53 Angstroms and d=0.70 Angstroms.

7. The process of claim 1 in which the post-treat hydrodesulfurization step is carried out at a total system pressure of at least about 40 barg, and the feed is of petroleum origin.

8. A two-stage hydrocracking process for convening a feed of petroleum origin to lower boiling products of higher gravity and low sulfur content, which process comprises:
   (i) hydrotreating a feed of petroleum origin having a sulfur content greater than about 3,000 wppm in the presence of hydrogen-containing treat gas in a hydrotreating step containing one or more reaction zones, to produce a hydrotreated effluent stream comprising a liquid product stream having a sulfur and nitrogen content less than that of the feed together with a gas stream comprising hydrogen, ammonia and hydrogen sulfide;
   (ii) passing the hydrotreated stream effluent directly to a first hydrocracking stage containing one or more reaction zones in which the liquid product stream is hydrocracked in the presence of the gas stream to reduce its boiling range and produce a first hydrocracked effluent stream comprising hydrocracked liquid products and gas comprising hydrogen, ammonia and hydrogen sulfide;

(iii) removing ammonia from the first hydrocracked effluent stream;

(iv) passing the liquid products of the first hydrocracking stage to a second hydrocracking stage containing one or more reaction zones in which the liquid product stream is hydrocracked in the presence of hydrogen-containing treat gas to reduce its boiling range and produce a second hydrocracked effluent stream comprising a second hydrocracked liquid product steam having a nitrogen content of not more than about 100 wppm and a second gas stream gas comprising hydrogen, ammonia and hydrogen sulfide;

(v) passing the second hydrocracked effluent stream without separation of the liquid products from the gas to a post-treat hydrodesulfurization zone located in the same reactor as at least one reach on zone of the second hydrocracking stage, in which the hydrocracked liquid product stream is hydrodesulfurized in the presence of the second gas stream and a hydrodesulfurization catalyst comprising a bulk multimetallic catalyst comprised of one Group VIII non-noble metal and two Group VIB metals and in which the ratio of Group VIB metal to Group VIII non-noble metal is from about 10:1 to about 1:10, to produce a second hydrocracked, hydrodesulfurized liquid product stream having a sulfur content of less than about 100 wppm sulfur, wherein the hydrodesulfurization of the second hydrocracked effluent stream is carried out at a total system pressure of at least about 25 barg.

9. The process of claim 8 in which:

(vi) the first hydrocracked effluent stream is passed directly from the first hydrocracking stage prior to removal of the ammonia to an intermediate hydrodesulfurization step in which it is hydrodesuflurized in the presence of a hydrogen-containing treat gas and a hydrodesulfurization catalyst comprising a bulk multimetallic catalyst comprised of at least one Group VIII non-noble metal and at least two Group VIB metals and in which the ratio of Group VIB metal to Group VIII non-noble metal is from about 10:1 to about 1:10.

10. The process of claim 9 in which the effluent from the intermediate hydrodesulfurization step is subjected to an ammonia removal step and a hydrogen sulfide removal step before passing to the second hydrocracking zone.

11. The process of claim 8 in which:

(vii) the first hydrocracked effluent stream is passed to a fractionation zone to form at least one light fraction and a higher boiling heavy fraction and the heavy fraction is passed as feed to the second hydrocracking stage, and (viii) the second hydrocracked, hydrodesulfurized liquid product stream is passed to the fractionation zone with the hydrocracked effluent stream from the first hydrocracking stage.

12. The process of claim 8 in which the liquid product stream of the second hydrocracking stage has a nitrogen content of not more than about 50 ppmw at the beginning of the post-treat hydrodesulfurization stage.

13. The process of claim 8 in which the liquid product stream of the second hydrocracking stage has a nitrogen content of not more than about 95 ppmw at the beginning of the post-treat hydrodesulfurization stage.

14. The process of claim 8 in which the liquid product stream of the second hydrocracking stage is passed over the bulk multimetallic catalyst at a space velocity of at least about 1.5 v/v/hr.

15. A two-stage hydrocracking process for converting a feed of petroleum origin to tower boiling products of higher gravity and low sulfur content including a middle distillate fraction containing no more than about 50 ppmw sulfur, which process comprises:

(i) hydrotreating a feed of petroleum origin having a sulfur content greater than about 3,000 wppm in the presence of hydrogen-containing treat gas in a hydrotreating step containing one or more reaction zones at a system pressure of at least about 40 barg, reactor inlet, to produce a hydrotreated effluent stream comprising a liquid product stream having a sulfur and nitrogen content less than that of the feed together with a gas stream comprising hydrogen, ammonia and hydrogen sulfide;

(ii) passing the hydrotreated effluent stream directly to a first hydrocracking stage containing one or more reaction zones in which the liquid product stream is hydrocracked in the presence of the gas stream to reduce its boiling range and produce a first hydrocracked effluent stream comprising hydrocracked liquid products and gas comprising hydrogen, ammonia and hydrogen sulfide;

(iii) removing ammonia from the first hydrocracked effluent stream;

(iv) passing the liquid products of the first hydrocracking stage to a second hydrocracking stage containing one or more reaction zones in which the liquid product stream is hydrocracked in the presence of hydrogen-containing treat gas at a total pressure of at least about 40 barg to reduce its boiling range and produce a second hydrocracked effluent stream comprising a second hydrocracked liquid product steam having a nitrogen content of not more than about 100 ppmw and a second gas steam gas comprising hydrogen, ammonia and hydrogen sulfide;

(v) passing the second hydrocracked effluent stream to a post-treat hydrodesulfurization zone located in the same reactor as at least one reaction zone of the second hydrocracking stage, in which the hydrocracked liquid product stream is hydrodesulfurized in the presence of the second gas steam and a hydrodesulfurization catalyst comprising a bulk multimetallic catalyst comprised of one Group VIII non-noble metal and two Group VIB metals and in which the ratio of Group VIB metal to Group VIII non-noble metal is from about 10:1 to about 1:10, at a liquid hourly space velocity of at least about 0.67 v/v/hr, to produce a second hydrocracked, hydrodesulfurized liquid product stream having a sulfur content of less than about 100 wppm sulfur, wherein the hydrodesulfurization of the second hydrocracked effluent steam is carried out at a total system pressure of at least about 25 barg.

16. The process of claim 15 in which the liquid product steam of the second hydrocracking zone has a nitrogen content of not more than about 50 ppmw at the beginning of the post-treat hydrodesulfurization zone.

17. The process of claim 15 in which the effluent stream of the second hydrocracking zone is passed over the multimetallic catalyst at a liquid hourly space velocity of at least about 1.0 v/v/hr.

18. The process of claim 1, wherein the hydrocracked liquid product is hydrodesulfurized in the presence of a hydrogen-containing treat gas and a bulk multimetallic catalyst at a liquid hourly space velocity of from about 1.0 v/v/hr to about 2.0 v/v/hr, and wherein the post-treat hydrodesulfurization step is carried out at a total system pressure from at least about 25 barg to about 45 barg.

19. The process of claim 15, wherein the second hydrocracked liquid product is hydrodesulfurized in the presence of a hydrogen-containing treat gas and a bulk multimetallic catalyst at a liquid hourly space velocity of from about 1.0 v/v/hr to about 2.0 v/v/hr, and wherein the post-treat hydrodesulfurization step is carried out at a total system pressure from at least about 25 barg to about 45 barg.

* * * * *